United States Patent [19]

Miyake et al.

[11] Patent Number: 4,930,846
[45] Date of Patent: Jun. 5, 1990

[54] ANTI-LOCK CONTROL APPARATUS

[75] Inventors: Katsuya Miyake, Ageo; Yoshiaki Hirobe, Shiraoka, both of Japan

[73] Assignee: Akebomo Brake Industry Co., Japan

[21] Appl. No.: 320,575

[22] Filed: Mar. 8, 1989

[30] Foreign Application Priority Data

Mar. 30, 1988 [JP] Japan .................. 63-77905

[51] Int. Cl.⁵ .............................. B60T 8/62
[52] U.S. Cl. .................. 303/111; 303/24.1; 303/115
[58] Field of Search .............. 303/24.1, 92, 97, 99, 303/110, 111, 113, 114, 115, 116, 119

[56] References Cited

U.S. PATENT DOCUMENTS

| | | | |
|---|---|---|---|
| 4,733,921 | 3/1988 | Farr | 303/111 |
| 4,752,104 | 7/1988 | Miyake | 303/114 |
| 4,755,008 | 7/1988 | Imoto et al. | 303/110 |
| 4,758,054 | 7/1988 | Brown | 303/114 |

Primary Examiner—Duane A. Reger

[57] ABSTRACT

An anti-lock control apparatus of this invention has modulators each of which is disposed at a point between said master cylinder and each set of front and rear brakes. Each modulator has a stepped piston in its cylinder. In the cylinder, are formed a front output fluid chamber and a rear output fluid chamber both of which follow the master cylinder. The front output fluid chamber is connected to the front brake, while the rear output fluid chamber is connected to the rear brake. The front output fluid chamber normally communicates with the rear output fluid chamber and, during anti-lock operation, the communication between the front output fluid chamber and the rear output fluid chamber is cut off by a cut-off valve portion. Thus, the fluid pressure of the rear brake can be maintained at the fluid pressure in the cut-off state.

11 Claims, 2 Drawing Sheets

ANTI-LOCK CONTROL APPARATUS

BACKGROUND OF THE INVENTION

1. Field of the Invention

The present invention relates to an anti-lock control apparatus and, more particularly, to an improvement in an anti-lock control apparatus of the so-called two-channel diagonal simultaneous control type which is suitable for use in, particularly, four-wheel vehicles and in which the front and rear brakes on the right and left sides are diagonally joined so that the front brake and the rear brake which are located on each diagonal line may be simultaneously controlled.

2. Description of the Related Art

It has been proposed to provide various types of anti-lock control apparatus for use in a brake system in which a brake line serving to brake a left front wheel and a right rear wheel is independent of a brake line serving to brake a right front wheel and a left rear wheel. For example, a known type of anti-lock control apparatus is arranged so that, if the front or rear wheel in either brake line shows a tendency to wheel-lock, then pressure decreasing control may be exerted over the fluid pressure of a front brake and the fluid pressure of its corresponding rear brake at the same time.

However, such a conventional type of anti-lock control apparatus leaves the following problem to be solved. When a vehicle is being braked while it is running on a so called split road surface, whose right and left sides exhibit different friction coefficients $\mu$, or when an anomalous distribution of the braking force occurs between the front and rear wheels, a rear wheel may show a tendency to wheel-lock prior to the corresponding front wheel. In this case, since pressure decreasing control is provided over the fluid pressure of the front wheel and that of the rear wheel at the same time, the fluid pressure of the front wheel, which has not yet shown the tendency to wheel-lock, would be decreased to an excessive extent, and the resultant braking force might fall short of the total braking force required to stop the vehicle.

Incidentally, the related arts are disclosed in U.S. Pat. No. 4,752,104 and U.S. Pat. application Ser. No. 07/213,127 (patent pending).

SUMMARY OF THE INVENTION

It is, therefore, an object of the present invention to provide an anti-lock control apparatus which solves the problem involved in the conventional apparatus and which reliably supplies sufficient braking force to the whole of a vehicle by substantially preventing any excessive decrease in the fluid pressure of front wheels.

To achieve the above object, in accordance with the present invention, there is provided an anti-lock control apparatus having the following technical feature.

More specifically, the apparatus of the present invention is provided with modulators which are respectively disposed at a point between a master cylinder and each set of front and rear brakes.

Each of the modulators has a cylinder in its interior, and a stepped piston is accommodated in the cylinder. The stepped piston has a large diameter portion and a small diameter portion which extends forwardly from the large diameter portion. In addition, in the cylinder, an input fluid chamber for receiving fluid pressure from the master cylinder is defined between the large diameter portion and the small diameter portion of the stepped piston. If it is assumed that the small diameter portion of the stepped piston is located on the front side with the large diameter portion located on the rear side, a backpressure fluid chamber is defined at the rear of the large diameter portion. A front output fluid chamber connected to the corresponding front brake and a rear output fluid chamber connected to the corresponding rear brake are defined at different locations at the front of the small diameter portion.

The front output fluid chamber and the rear output fluid chamber communicate with each other when the stepped piston is displaced toward the backpressure fluid chamber. A cut-off valve portion is formed on the front of the small diameter portion of the stepped piston. When the stepped piston is moved forward, the cut-off valve portion comes into contact with a cut-off valve seat formed on the cylinder to cut off the communication between the front output fluid chamber and the rear output fluid chamber.

In addition, a communication channel extends through the large diameter portion so as to provide communication between the backpressure fluid chamber and the input fluid chamber. A check valve is disposed at an intermediate location in the communication channel such that the direction of a fluid flow from the backpressure fluid chamber to the input fluid chamber corresponds to the forward direction of the check valve.

The input fluid chamber and the front output fluid chamber are connected by a first fluid channel through a normally open hold valve, and also the front output fluid chamber is connected to a reservoir by a second fluid channel through a normally closed decay valve. In addition, the reservoir is connected to the aforesaid backpressure fluid chamber by a third fluid channel, and a pump is inserted at a point in the third fluid channel for pumping a brake fluid from the reservoir into the backpressure fluid chamber.

The anti-lock control apparatus described above is arranged to close the hold valve and open the decay valve when a tendency to wheel-lock appears.

In the arrangement described above, when no brake is in operation, the stepped piston is displaced into the backpressure fluid chamber and the cut-off valve portion is separated from the cut-off valve seat of the cylinder with the front output fluid chamber communicating with the rear output fluid chamber.

When a brake pedal (not shown) is depressed, the fluid pressure created in the master cylinder is supplied through the input fluid chamber, the hold valve, and the first fluid channel to each of the front output fluid chamber and the rear output fluid chamber, and is then transmitted to the front brake and the rear brake from the respective output fluid chambers.

It is to be noted that a proportioning valve is disposed at a point between the rear output fluid chamber and the rear brake. The proportioning valve normally serves to make the rate of increase in the fluid pressure of the rear brake lower than the rate of increase in the fluid pressure of the front brake, thereby making proper the distribution of braking force between the front and rear wheels.

For the purpose of illustration, it is assumed that, when the vehicle is running on a split road surface, its rear wheel shows a tendency to wheel-lock prior to the corresponding front wheel.

On condition that the tendency for the rear wheel to wheel-lock has been detected, in response to the command of an electronic control unit (ECU), the hold valve is closed while the decay valve is opened, and a front brake fluid and a rear brake fluid pass through the front output fluid chamber and the rear output fluid chamber, respectively, then through the decay valve and the second fluid channel, and is then sucked into the reservoir. Thus, the fluid pressure of both the front brake and the rear brake is decreased at the same time, and locking of the rear wheel is avoided.

The brake fluid in the reservoir is pumped by the pump and returned to the backpressure fluid chamber through the third fluid channel. When the fluid pressure in the backpressure fluid chamber exceeds the fluid pressure of the master cylinder, then the check valve opens and the brake fluid flows into the input fluid chamber, thus returning to the master cylinder.

During this time, the stepped piston is caused to move toward the rear output fluid chamber (to the right in FIG. 1) in accordance with the relationship between the fluid pressure in the backpressure fluid chamber, which is applied by the pump to the cross-sectional area of the large diameter portion of the stepped piston, and the brake fluid pressure applied to the cross-sectional area of the small diameter portion of the stepped piston. Thus, the cut-off valve portion comes into contact with the cut-off valve seat of the cylinder to cut off the communication between the front output fluid chamber and the rear output fluid chamber. Accordingly, the fluid pressure of the rear brake is maintained at the fluid pressure in the cut-off state.

After the wheel lock has been avoided, the decay valve is closed while the hold valve is opened, since it is necessary to again increase the brake fluid pressure. During this time, the cut-off valve portion is closed with the stepped piston displaced on the right side as viewed in FIG. 1. Therefore, any increase in the fluid pressure of the rear brake is suppressed and the fluid pressure of the front brake alone increases.

As a result, the front wheel may subsequently show a tendency to wheel-lock prior to the rear wheel. However, even during anti-lock control which is exerted when the tendency for the front wheel to wheel-lock has been detected, there is no risk of decreasing the fluid pressure of the front wheel to an excessive extent as compared with the conventional arrangement in which the fluid pressure of the front wheel is decreased in synchronization with a pressure decrease which is effected in order to avoid prior locking of the rear wheel.

DESCRIPTION OF THE PREFERRED EMBODIMENTS

Figure 1:
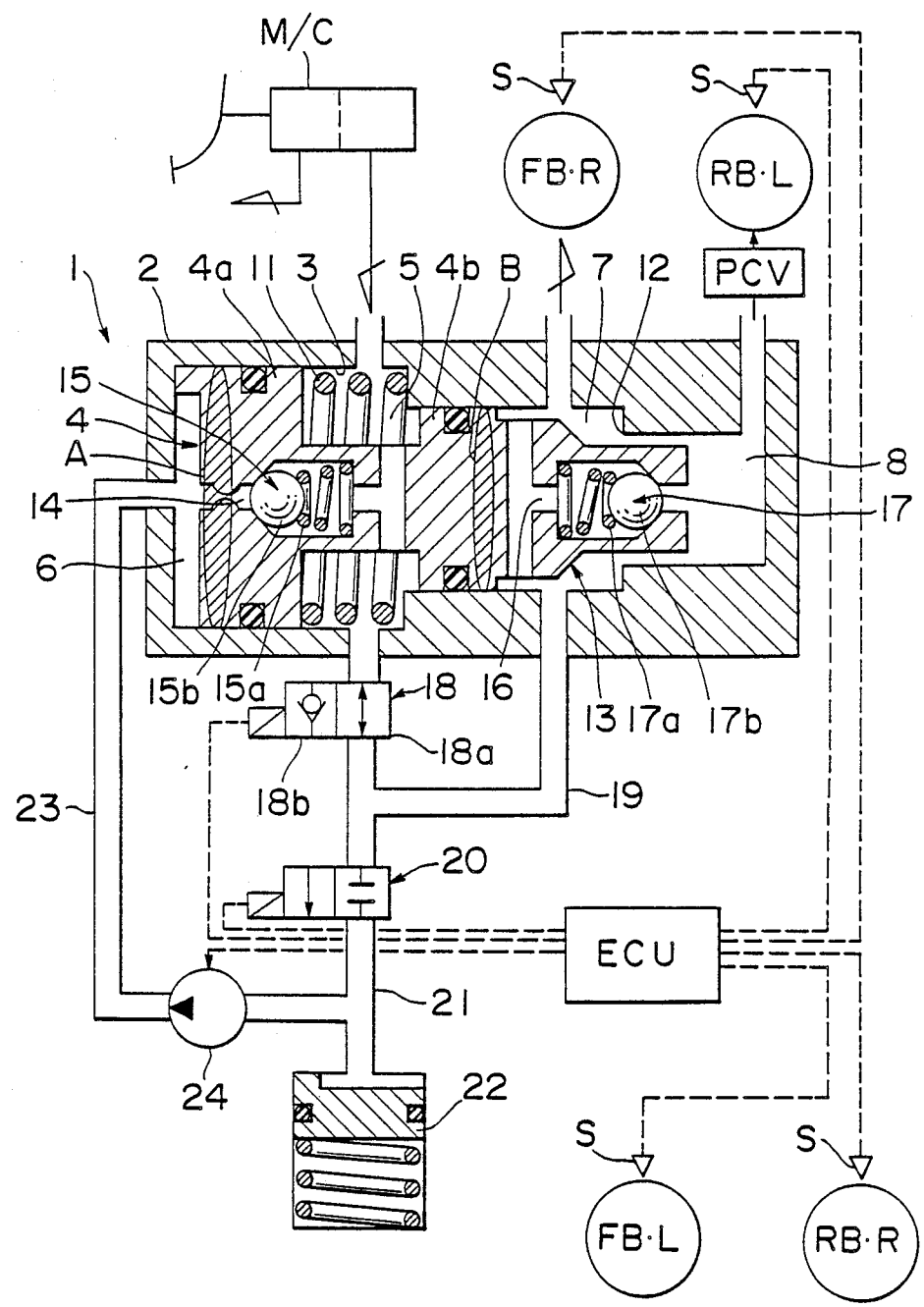
FIG. 1 is a block diagram showing a fluid pressure line to which a first embodiment of the present invention is applied.

Preferred embodiments of the present invention will be described below with reference to the accompanying drawings.

EMBODIMENT 1

A first embodiment will be described below with reference to FIG. 1.

In this embodiment, modulators 1 (one of which is shown) are applied to a two-channel brake system in which a brake line serving to brake a left front wheel and a right rear wheel is independent of a brake line serving to brake a right front wheel and a left rear wheel.

A tandem type master cylinder M/C has two fluid-pressure generating chambers which are connected to the respective brake lines so that brake fluid pressure may be supplied to the individual brake lines.

The modulators 1 are respectively disposed at a point between the master cylinder M/C and a set of a left front brake FB·L and a right rear brake RB·R and between the master cylinder M/C and a set of a right front brake FB·R and a left rear brake RB·L.

Since the modulators 1 which are provided in the respective brake lines are of the same type, the following description will be centered on the modulator 1 which is provided in the brake line serving to brake the right front wheel and the left rear wheel. Thereafter, the operation of the present anti-lock control apparatus will be explained.

In this embodiment, the illustrated modulator 1 is disposed at a point between the master cylinder M/C and the set of the right front brake (FB·R) and the left rear brake (RB·L). The modulator 1 has a cylinder 3 in its body 2, and a stepped piston 4 is accommodated in the cylinder 3. The stepped piston 4 has a large diameter portion 4a and a small diameter portion 4b which extends forwardly from the large diameter portion 4a. For the purpose of illustration, it is assumed that the small diameter portion 4b of the stepped piston 4 is located on the front side with the large diameter portion 4a located on the rear side.

In the cylinder 3, an input fluid chamber 5 for receiving fluid pressure from the master cylinder M/C is defined between the large diameter portion 4a and the small diameter portion 4b of the stepped piston 4, and a backpressure fluid chamber 6 is defined at the rear of the large diameter portion 4a. A front output fluid chamber 7 connected to the right front brake FB·R and a rear output fluid chamber 8 connected to the left rear brake RB·L are defined at different locations at the front of the small diameter portion 4b.

A spring 11 is provided in the input fluid chamber 5 so that the stepped piston 4 is urged toward the backpressure fluid chamber 6 by the spring 11.

In addition, the front output fluid chamber 7 and the rear output fluid chamber 8 communicate with each other when the stepped piston 4 is displaced toward the backpressure fluid chamber 6. A cut-off valve portion 13 is formed on the front of the small diameter portion 4b of the stepped piston 4. When the stepped piston 4 is moved forwardly, the cut-off valve portion 13 comes into contact with a cut-off valve seat 12 formed on the cylinder 3 to cut off the communication between the front output fluid chamber 7 and the rear output fluid chamber 8.

In addition, a first communication channel 14 extends through the large diameter portion 4a so as to provide communication between the backpressure fluid chamber 6 and the input fluid chamber 5. A first check valve 15 is disposed at an intermediate location in the first communication channel 14 such that the direction of a fluid flow from the backpressure fluid chamber 6 to the input fluid chamber 5 corresponds to the forward direction of the first check valve 15. The first check valve 15 is arranged to seat a ball 15b on a valve seat by the urging force of a set spring 15a and close the first communication channel 14.

A second communication channel 16 extends through the front portion of the small diameter portion 4b so as to provide communication between the front output fluid chamber 7 and the rear output fluid chamber 8. A second check valve 17 is disposed at an intermediate location in the second communication channel 16 such that the direction of a fluid flow from the rear output fluid chamber 8 to the front output fluid chamber 7 corresponds to the forward direction of the second check valve 17. Similarly to the first check valve 15, the second check valve 17 is arranged to seat a ball 17b on a valve seat by the urging force of a set spring 17a and close the second communication channel 16.

The input fluid chamber 5 and the front output fluid chamber 7 are connected by a first fluid channel 19 through a normally open hold valve 18. The hold valve 18 is provided with a communication section 18a and a cut-off portion 18b and is arranged to open and close by effecting switching between the communication section 18a and the cut-off portion 18b. The cut-off portion 18b constitutes a check valve whose forward direction corresponds to the direction of a fluid flow from the front output fluid chamber 7 to the input fluid chamber 5.

The front output fluid chamber 7 is connected to a reservoir 22 by a second fluid channel 21 through a normally closed decay valve 20. In addition, the reservoir 22 is connected to the backpressure fluid chamber 6 by a third fluid channel 23, and a pump 24 is inserted at a point in the third fluid channel 23 for pumping brake fluid from the reservoir 22 into the backpressure fluid chamber 6.

Each of the hold valve 18 and the decay valve 20 is a solenoid valve, and is electrically connected to an electronic control unit(ECU)which uses a microcomputer. In addition to the pump 24, wheel speed sensors S provided on the respective front and rear wheels are connected to the electronic control unit (ECU). On the basis of signals supplied from the respective wheel speed sensors S, the electronic control unit ECU makes a decision as to whether each wheel may suffer a wheel lock, and issues a signal to drive the hold valve 18, the decay valve 20, and the pump 24.

It is to be noted that a proportioning valve PCV is inserted at a point between the rear output fluid chamber 8 and the left rear brake RB·L. The proportioning valve PCV serves to make the rate of increase in the fluid pressure of the left rear brake RB·L lower than the rate of increase in the fluid pressure of the right front brake FB·R.

The following is a description of an example of the operation of the anti-lock control apparatus to which the above-described embodiment is applied.

When no brake is in operation, the stepped piston 4 is displaced into the backpressure fluid chamber 6 and the cut-off valve portion 13 is separated from the cut-off valve seat 12 with the front output fluid chamber 7 communicating with the rear output fluid chamber 8.

For the purpose of illustration, it is assumed that the vehicle runs on a split road surface whose left side has a smaller friction coefficient $\mu$ than the right side. When a brake pedal (not shown) is depressed while running on the split road surface, the fluid pressure created in the master cylinder M/C is supplied through the input fluid chamber 5, the hold valve 18, and the first fluid channel 19 to each of the front output fluid chamber 7 and the rear output fluid chamber 8, and is then transmitted to the right front brake FB·R and the left rear brake RB·L from the respective output fluid chambers 7 and 8.

The rear braking force is controlled to be smaller than the front braking force by the presence of the proportioning valve PCV. Accordingly, there is no risk that the left rear wheel suffers a wheel lock prior to the right front wheel while running on an ordinary road surface. However, while running on the split road surface described above, the left rear wheel may show a tendency to wheel-lock prior to the right front wheel. Incidentally, while running on the above-described split road surface, the left front wheel tends to lock prior to the right rear wheel in the case of the line of the left front wheel and the right rear wheel.

On condition that the tendency for the left rear wheel to suffer a wheel lock has been detected on the line of the right front wheel and the left rear wheel, the hold valve 18 is closed while the decay valve 20 is opened in response to the command of the electronic control unit (ECU). Thus, a front brake fluid and a rear brake fluid pass through the front output fluid chamber 7 and the rear output fluid chamber 8, respectively, then through the decay value 20 and the second fluid channel 21, and is then sucked into the reservoir 22. Thus, the fluid pressure of both the right front brake FB·R and the left rear brake RB·L is decreased at the same time, and locking of the left rear wheel is avoided.

The brake fluid in the reservoir 22 is pumped by the pump 24 and returned to the backpressure fluid chamber 6 through the third fluid channel 23. When a fluid pressure Pa in the backpressure fluid chamber 6 exceeds the fluid pressure Pm of the master cylinder M/C (to be precise, when Pa·C>Pm·C+F2, where C=the area of the seat portion of the first check valve 15 and F2=the force of the set spring 15a), the first check valve 15 opens and the brake fluid flows into the input fluid chamber 5, thus returning to the master cylinder M/C.

During this time, the stepped piston 4 is caused to move toward the rear output fluid chamber 8 (to the right in FIG. 1) on condition that the relationship among F1, Pa and Pb1 assumes $$Pa \cdot A > Pb1 \cdot B + F1 + Pm(A-B)$$

where F1 represents the force of the spring 11, Pa represents the fluid pressure in the backpressure fluid chamber 6 which is applied by the pump 24 to the cross-sectional area A of the large diameter portion 4a of the stepped piston 4, and Pb1 represent the brake fluid pressure applied to the cross-sectional area B of the small diameter portion 4b of the stepped piston 4. Thus, the cut-off valve portion 13 comes into contact with the cut-off valve seat 12 of the cylinder 3 to cut off the communication between the front output fluid chamber 7 and the rear output fluid chamber 8. Accordingly, the fluid pressure of the left rear brake RB·L is maintained at the fluid pressure in the cut-off state.

After locking of the left rear wheel has been avoided, the decay valve 20 is closed while the hold valve 18 is opened in response to a command from the electronic control unit ECU, since it is necessary to again increase the brake fluid pressure During this time, the cut-off valve portion 13 is closed with the stepped piston 4 displaced on the right side as viewed in FIG. 1. Therefore, any increase in the fluid pressure of the left rear brake RB·L is suppressed and the fluid pressure of the right front brake FB·R alone increases.

As a result, the right front wheel may subsequently show a tendency to wheel-lock prior to the left rear wheel. In addition, pressure decreasing control which is exerted on the basis of the detection of the tendency for the right front wheel to wheel-lock is Originally intended for avoiding the locking of the right front wheel. It follows, therefore, that there is no risk of decreasing the fluid pressure of the right front wheel to an excessive extent as compared with the conventional arrangement in which the fluid pressure of the right front wheel is decreased in synchronization with a pressure decrease which is effected in order to avoid prior locking of the left rear wheel.

Anti-lock control for the subsequent wheel lock described above is exerted with the cut-off valve portion 13 closed. When a brake fluid pressure Pbf in the front output fluid chamber 7 is decreased to a level smaller than a brake fluid pressure Pbr in the rear output fluid chamber 8 (to be precise, when Pbf·D+F3<Pbr·D, where D=the area of the seat portion of the second check valve 17 and F3=the force of the set spring 17a), the second check valve 17 opens and the brake fluid pressure Pbr in the rear output fluid chamber 8 is also decreased.

As a matter of course, on the line of the left front wheel and the right rear wheel, the left front wheel, located on the left-hand side of the road surface, whose left-hand side has a smaller friction coefficient μ than the right-hand side, shows a tendency to wheel-lock prior to the right rear wheel. When the tendency for the left front wheel to suffer a wheel lock is detected, the hold valve 18 is closed while the decay valve 20 is opened in a manner similar to that used in the above-described operation, and the brake fluid of the left front wheel and the brake fluid of the right rear wheel are sucked into the reservoir 22. Thus, the fluid pressure of both the left front brake FB·L and the right rear brake RB·R is decreased at the same time, and locking of the right front wheel is avoided.

The brake fluid in the reservoir 22 is pumped by the pump 24 and returned to the backpressure fluid chamber 6. When the fluid pressure in the backpressure fluid chamber 6 exceeds the fluid pressure Pm of the master cylinder M/C (to be precise, the fluid pressure Pm of the master cylinder M/C + the force of the set spring 15a of the first check valve 15), the first check valve 15 opens and the brake fluid flows into the input fluid chamber 5, and thus returns to the master cylinder M/C. At this time, the stepped piston 4 is caused to move to the right in FIG. 1 and thus the cut-off valve portion 13 is closed, whereby the fluid pressure of the right rear brake RB·R is likewise maintained.

It is to be noted that, after locking of the left front wheel has been avoided, the decay valve 20 is closed while the hold valve 18 is opened, and the brake fluid pressure is increased.

EMBODIMENT 2

Figure 2:
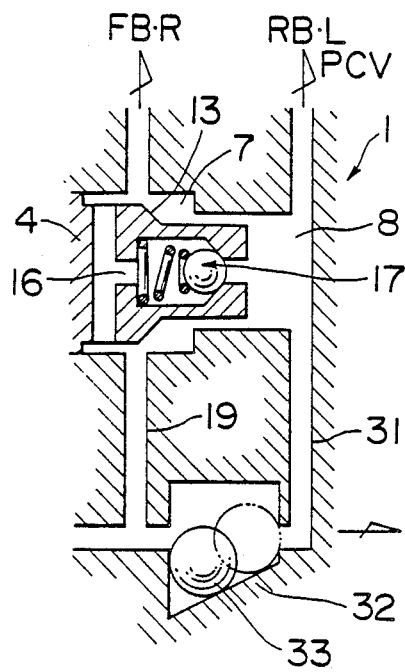
FIG. 2 is a diagrammatic view showing the essential portion of a second embodiment.

A second embodiment will be described below with reference to FIG. 2, which shows the essential portion of the same.

In the above-described first embodiment, if a decrease in the pressure of the brake fluid is effected under the first cycle of anti-lock control on the basis of a lock signal supplied from the right front wheel, the extent of the decrease in the fluid pressure of the left rear brake can be made smaller than the extent of the pressure decrease which is effected on the basis of a lock signal supplied from the left rear wheel. In particular, where the operation of the proportioning valve PCV contains a large hysteresis, the fluid pressure of the left rear brake RB·L is almost never decreased. Accordingly, a sufficient braking force for the left rear wheel can be obtained.

However, the above explanation applies only to the case of a road surface having a high friction coefficient μ(hereinafter referred to as the "high-μ road surface"). In the case of a road surface having a low friction coefficient μ (hereinafter referred to as the "low-μ road surface"), anti-lock control is started before the proportioning valve PCV reaches its crossover fluid pressure. Accordingly, the fluid pressure of the left rear brake RB·L is maintained with any substantial brake fluid pressure absent, with the result that the braking force of the left rear wheel may become insufficient. To solve such a problem, the second embodiment is constructed such that the following element are added to the first embodiment.

More specifically, the second embodiment includes a fourth fluid channel 31 for providing communication between the front output fluid chamber 7 and the rear output fluid chamber 8, as well as the elements of the first embodiment. A so-called G valve (deceleration sensing valve) 32 which operates in response to the deceleration of a vehicle is provided at an intermediate location in the fourth fluid channel 31.

The G valve 32 is constituted by a housing having a bottom surface which is inclined at an angle Θ and a ball 33 which rolls when the deceleration of the vehicle is sensed It is assumed that, of the opposite connecting ports of the front output fluid chamber 7 which are connected to the fourth fluid channel 31, the connecting port nearer to the front output fluid chamber 7 is used as an inlet port, while the other connecting port nearer to the rear output fluid chamber 8 is used as an output port. In this arrangement, the bottom surface of the housing is inclined upwardly toward the outlet port, and the periphery of the outlet port serves as a seat portion on which the ball 33 is to be seated.

An example of the operation of the second embodiment will be described below.

During normal application of the brakes, when they are not placed under anti-lock control, if the deceleration of the vehicle is high (in the case of the high-μ road surface), the momentum of the ball 33 causes it to ascend the inclined bottom surface to be seated on the seat portion, thereby closing the fourth fluid channel 31. However, since the cut-off valve portion 13 is not seated on the cut-off valve seat 12, the channel extending to the left rear brake RB·L is not cut off. If the deceleration of the vehicle is low (in the case of the low-μ road surface), the G valve 32 does not work. In addition, if there is no risk of occurrence of a wheel lock, no anti-lock control is exerted and the cut-off valve 13 is not closed, so that the channel extending to the left rear brake RB·L is not cut off.

On the other hand, if the anti-lock control is exerted during application of the brakes, the cut-off valve portion 13 in the first embodiment is closed so that the fluid pressure of the left rear brake RB·L may in any case be maintained at a decreased fluid pressure. However, the operation of the second embodiment differs from that of the first embodiment in the following respect.

More specifically, in the second embodiment, in the case of low deceleration (while running on the low-μ road surface), under the anti-lock control, the cut-off valve portion 13 is closed but the G valve 32 is not closed, so that the channel extending to the left rear brake RB·L is not cut off. Accordingly, it is possible to again increase the fluid pressure of the left rear brake RB.L and hence avoid a shortage of braking force which may be experienced while running on the low-μ road surface.

In contrast, in the case of high deceleration (while running on the high-μ road surface), under the anti-lock control, the cut-off valve portion 13 is closed and the G valve 32 is also closed, so that the channel extending to the left rear brake RB·L is cut off and the fluid pressure of the left rear brake RB·L is held in a decreased state, similarly to the case of the first embodiment.

As described above, with the second embodiment, it is possible to provide the advantage of preventing a shortage of rear braking force in the case of low deceleration

EMBODIMENT 3

Figure 3:
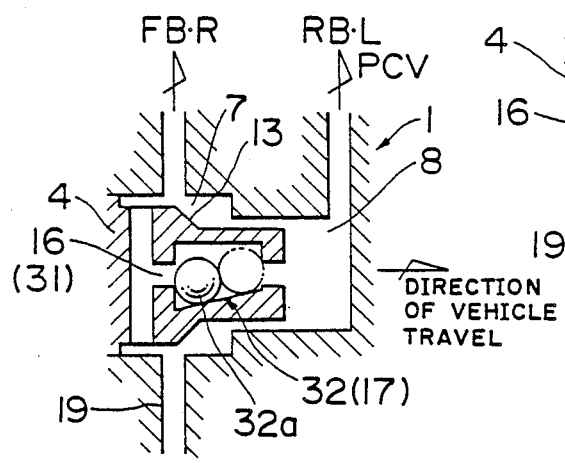
FIG. 3 is a diagrammatic view showing the essential portion of a third embodiment.

A third embodiment, whose essential portion is shown in FIG. 3, is based on a concept which is identical to that of the second embodiment. As illustrated, the second communication channel 16 of the first embodiment is formed to serve also as the fourth fluid channel 31, and the G valve 32 is formed to serve also as the second check valve 17 which is provided in the second communication channel 16. These elements are integrally combined and the resultant operation is substantially identical to the operation of the second embodiment.

EMBODIMENT 4

Figure 4:
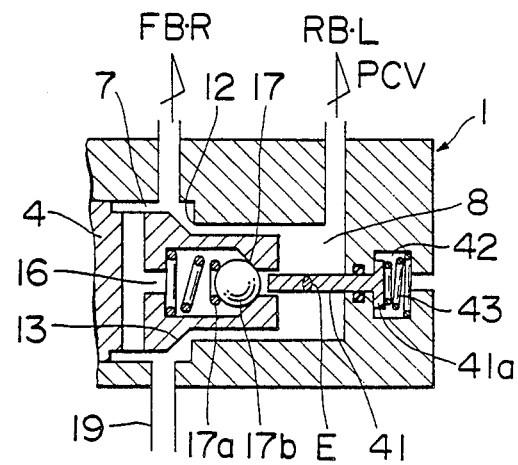
FIG. 4 is a diagrammatic view showing the essential portion of a fourth embodiment.

A fourth embodiment, whose essential portion is shown in FIG. 4, includes the elements of the first embodiment and elements which differ from the elements added in the second embodiment but have the same purpose as it has.

More specifically, a push rod 41 projects from the interior of the modulator body 2 which opposes the front of the second check valve 17, and extends toward a ball 17b of the second check valve 17. A spring cavity 42 is formed in the body 2 of the modulator 1, and the proximal end of the push rod 41 is located in the spring cavity 42. A flange 41a is formed at the proximal end for preventing the push rod 41 from coming off, and a pressure detecting spring 43 is provided in the spring cavity 42. The flange 41a is normally pressed by the pressure detecting spring 43 so that the push rod 41 may be urged toward the ball 17b. The spring cavity 42 is open to the atmosphere, and no force other than the force of the pressure detecting spring 43 is applied to the push rod 41.

The force (F4l of the pressure detecting spring 43 is selected to be greater than the force (F3) of the set spring 17a of the second check valve 17.

The following is a description of an example of the operation of the fourth embodiment.

The push rod 41 can move against the pressure detecting spring 43 when the following relationship is obtained $$Pg > (F4 - F3)/E$$

where Pg represents the working pressure of the push rod 41 and E represents the cross-sectional area of the push rod 41.

Accordingly, in the case of low deceleration (the low-μ road surface), under the anti-lock control, the stepped piston 4 is caused to move to the right in FIG. 4 and the cut-off valve portion 13 is closed. However, since the pressure Pg applied to the push rod 41 is small, the above relationship assumes $Pg \leq (F4-F3)/E$ and the push rod 41 is held in a stationary state. As the result of the movement of the stepped piston 4, the second check valve 17 is relatively opened. Thus, the channel extending to the left rear brake RB·L is kept closed, whereby it is possible to again increase the fluid pressure of the left rear brake RB·L and therefore avoid a shortage of braking force while running on the low-μ road surface.

In contrast, in the case of high acceleration (while running on the high-μ road surface), the cut-off valve portion 13 is closed under the anti-lock control. However, since the pressure Pg applied to the push rod 41 is large, the above relationship assumes $Pg > (F4-F3)/E$ and the push rod 41 is forced to move to the right as viewed in FIG. 4. Accordingly, the second check valve 17 is held in a closed state and the channel extending to the left rear brake RB·L is cut off. In consequence, as in the case of the first embodiment, the fluid pressure of the left rear brake RB·L is maintained in a decreased state.

In this fashion, the fourth embodiment can achieve an advantage similar to that of the second embodiment.

EMBODIMENT 5

Figure 5:
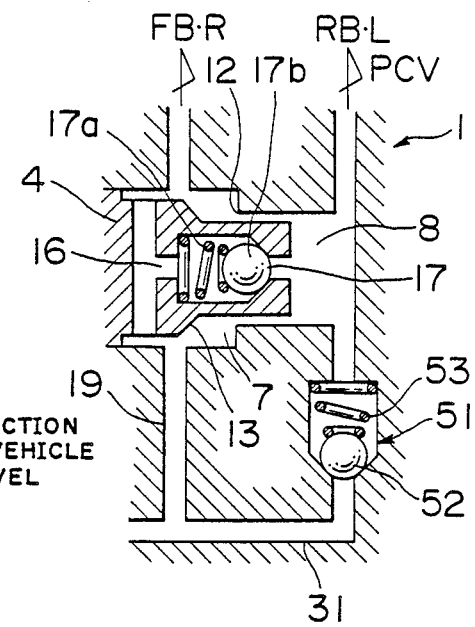
FIG. 5 is a diagrammatic view showing the essential portion of a fifth embodiment.

A fifth embodiment, whose essential portion is shown in FIG. 5, is provided with a differential pressure regulating valve 51 in place of the G valve 32 at an intermediate location in the fourth fluid channel 31 of the second embodiment.

The differential pressure regulating valve 51 is arranged such that its forward direction corresponds to the direction in which brake fluid pressure is applied to the left rear brake RB·L. The differential pressure regulating valve 51 is provided with a ball 52 and a set spring 53 which serves to seat the ball 52. After the cut-off valve portion 13 of the stepped piston 4 has been closed, the rear brake fluid pressure Pbr forwardly of the proportioning valve PCV is controlled by the differential pressure regulating valve 51 to become low compared to the fluid pressure Pbf on the side closer to the front output fluid chamber 7. More specifically, $$Pbf \cdot H = Pbr \cdot H + F5$$

where
- H: area of a seat portion on which the ball 52 is seated; and
- F5: force of the set spring 53

From the above equation, the following equation is obtained $$Pbf - F5/H = Pbr$$

As can be seen from the above equation, the rear brake fluid pressure Pbr forwardly of the proportioning valve PCV is controlled to be lower by F5/H than the fluid pressure Pbf on the side closer to the front output fluid chamber 7.

The operation of the anti-lock control apparatus according to the fifth embodiment is described below.

During normal control of the brakes, the stepped piston 4 does not move and the cut-off valve portion 13 is open. Accordingly, there is no influence of the differential pressure regulating valve 51, and Pbf=Pbr is maintained.

When the anti-lock control is started during application of the brakes, the cut-off valve portion 13 is closed. Subsequently, an increase in the fluid pressure Pbr is effected through the differential pressure regulating valve 51. Accordingly, the fluid pressure Pbr increases while retaining a value which is lower than the fluid pressure Pbf by F5/H. Thus, the subsequent locking of the left rear wheel prior to the right front wheel is avoided, and the anti-lock control is exerted on the basis of a wheel-lock signal representing the tendency for the left rear wheel to suffer a wheel lock prior to the right front wheel. Accordingly, it is possible to prevent the front brake fluid pressure from decreasing to an excessive extent.

As described above, in accordance with the present invention, after the anti-lock control has been started in response to a first application of the wheel-lock signal, the braking force is distributed between the front and rear wheels in either brake line so that the front wheel may show a tendency to wheel-lock prior to the rear wheel. Accordingly, since the fluid pressure of the front brake is not decreased to an excessive extent under the subsequent anti-lock control, it is possible to provide a sufficient braking force which the vehicle would require and hence to shorten the braking distance thereof.

What is claimed is:

1. An anti-lock control apparatus comprising:
   a modulator disposed at a point between a master cylinder and each set of front and rear brakes;
   a stepped piston accommodated in the cylinder of said modulator, said stepped piston having a large diameter portion and a small diameter portion which projects from said large diameter portion in the direction parallel to the axis of said large diameter portion;
   an input fluid chamber defined between said large diameter portion and said small diameter portion o said stepped piston in said cylinder, said input fluid chamber being formed to receive fluid pressure from said master cylinder;
   a backpressure fluid chamber defined on the side of said large diameter portion which is opposite to said small diameter portion;
   a front output fluid chamber defined at a first location on the side of said small diameter portion which is opposite to said large diameter portion, said front output fluid chamber being connected to said front brake;
   a rear output fluid chamber defined at a second location on the side of said small diameter portion which is opposite to said large diameter portion, said rear output fluid chamber being connected to said rear brake, said front output fluid chamber and said rear output fluid chamber communicating with each other when said stepped piston is displaced in said backpressure fluid chamber;
   a cut-off valve portion formed on a front portion of said small diameter portion of said stepped piston;
   a cut-off valve seat formed on said cylinder in opposed relationship to said cut-off valve portion, the communication between said front output fluid chamber and said rear output fluid chamber being cut off when said stepped piston is displaced in the direction away from said backpressure fluid chamber to bring said cut-off valve portion into contact with said cut-off valve seat
   a communication channel extending through said large diameter portion to provide communication between said backpressure fluid chamber and said input fluid chamber;
   a check valve disposed at an intermediate location in said communication channel with the forward direction of said check valve corresponding to the direction of a fluid flow from said backpressure fluid chamber to said input fluid chamber;
   a first fluid channel including a normally open hold valve, said input fluid chamber and said front output fluid chamber being connected by said first fluid channel through said normally open hold valve;
   a second fluid channel including a normally closed decay valve, said front output fluid chamber being connected to a reservoir by said second fluid channel through said normally closed decay valve; and
   a third fluid channel including a pump, said reservoir being connected to said backpressure fluid chamber by said third fluid channel through said pump so that brake fluid may be pumped from said reservoir into said backpressure fluid chamber through said third fluid channel,
   whereby when a tendency to wheel-lock appears, said hold valve is closed, while said decay valve is opened.

2. The combination of said anti-lock control apparatus according to claim 1 and a braking system in which a first brake line for braking a left front wheel and a right rear wheel is independent of a second brake line for braking a right front wheel and a left rear wheel.

3. An anti-lock control apparatus according to claim 1, wherein said modulator includes a spring which urges said stepped piston toward said backpressure fluid chamber.

4. An anti-lock control apparatus according to claim 1, wherein said modulator further includes a second communication channel which extends through said small diameter portion of said stepped piston to provide communication between said front output fluid chamber and said rear output fluid, a second check valve being disposed at an intermediate location in sid second communication channel such that the direction of a fluid flow from said rear output fluid chamber to said front output fluid chamber corresponds to the foward direction of said second check valve.

5. An anti-lock control apparatus according to claim 4, wherein each of said first and second check valves includes a set spring, a valve seat, and a ball, said ball being arranged to be seated on said valve seat by said set spring.

6. An anti-lock control apparatus according to claim 4, wherein said modulator further includes a fourth fluid channel for providing communication between said front output fluid chamber and said rear output fluid chamber, a deceleration sensing valve which operates in response to the deceleration of a vehicle being disposed at an intermediate location in said fourth fluid channel.

7. An anti-lock control apparatus according to claim 6, wherein said deceleration sensing valve includes an inclined surface, a seat portion, and a ball, said ball being arranged to roll on said inclined surface and be seated on said seat portion when deceleration is sensed.

8. An anti-lock control apparatus according to claim 4, wherein said second check valve is arranged to serve also as a deceleration sensing valve which operates in response to the deceleration of a vehicle.

9. An anti-lock control apparatus according to claim 8, wherein said second check valve includes an inclined surface, a seat portion, and a ball, said ball being arranged to roll on said inclined surface and be seated on said seat portion when deceleration is sensed.

10. An anti-lock control apparatus according to claim 5, wherein said modulator further includes a push rod and a pressure detecting spring, said push rod being urged by said pressure detecting spring to project toward said second check valve, the force of said pressure detecting spring being selected to be greater than the force of said set spring of said second check valve.

11. An anti-lock control apparatus according to claim 4, wherein said modulator further includes a fourth fluid channel for providing communication between said front output fluid chamber and said rear output fluid chamber, a differential pressure regulating valve being disposed at an intermediate location in said fourth fluid channel such that the forward direction of said differential pressure regulating valve corresponds to the direction of a fluid flow from said front brake to said rear brake.

* * * * *

UNITED STATES PATENT AND TRADEMARK OFFICE
CERTIFICATE OF CORRECTION

PATENT NO. : 4,930,846

DATED : June 5, 1990

INVENTOR(S) : Katsuya MIYAKE et al

It is certified that error appears in the above-identified patent and that said Letters Patent is hereby corrected as shown below:

Title page:

Section [73] Assignee: change "Akebomo" to --Akebono--

Signed and Sealed this

Third Day of September, 1991

*Attest:*

HARRY F. MANBECK, JR.

*Attesting Officer*  *Commissioner of Patents and Trademarks*